United States Patent
Huang (10) Patent No.: US 11,151,414 B2
(45) Date of Patent: Oct. 19, 2021

(54) TRAINING IMAGE ENHANCEMENT MODEL AND ENHANCING IMAGE

(71) Applicant: Shanghai Neusoft Medical Technology Co., Ltd., Shanghai (CN)

(72) Inventor: Feng Huang, Shanghai (CN)

(73) Assignee: Shanghai Neusoft Medical Technology Co., Ltd., Shanghai (CN)

(*) Notice: Subject to any disclaimer, the term of this patent is extended or adjusted under 35 U.S.C. 154(b) by 0 days.

(21) Appl. No.: 15/930,047

(22) Filed: May 12, 2020

(65) Prior Publication Data
US 2020/0364500 A1 Nov. 19, 2020

(30) Foreign Application Priority Data
May 13, 2019 (CN) .......................... 201910395631.0

(51) Int. Cl.
*G06K 9/62* (2006.01)
*G06N 3/08* (2006.01)
*G06T 5/00* (2006.01)

(52) U.S. Cl.
CPC ............. *G06K 9/6256* (2013.01); *G06N 3/08* (2013.01); *G06T 5/00* (2013.01); *G06T 2207/20081* (2013.01); *G06T 2207/20084* (2013.01)

(58) Field of Classification Search
CPC ............. G06K 2209/05; G06K 9/6261; G06K 9/00671; G06K 9/00201; G06K 9/00362; G06K 9/00369; G06N 20/00; G06N 20/20; G06N 3/04; G06N 3/0427; G06N 3/0445; G06N 3/0454; G06N 3/0472; G06N 3/0481; G06N 3/08; G06N 3/084; G06N 3/126
USPC ......................................... 382/157
See application file for complete search history.

(56) References Cited

U.S. PATENT DOCUMENTS 10,140,544 B1* 11/2018 Zhao ....................... G06T 7/143
2019/0333198 A1* 10/2019 Wang ................... G06N 3/0454

* cited by examiner

*Primary Examiner* — Ajibola A Akinyemi
(74) *Attorney, Agent, or Firm* — Fish & Richardson P.C.

(57) ABSTRACT

Methods, devices, systems and apparatus for training image enhancement models and enhancing images are provided. In one aspect, a method of training an image enhancement model includes: for each of one or more constraint features, processing a ground truth image with the constraint feature to obtain a feature image corresponding to the constraint feature, for each of the one or more feature images, using the ground truth image and the feature image to train a convolutional neural network (CNN) structure model corresponding to the feature image, determining a loss function of the image enhancement model based on the one or more CNN structure models corresponding to the one or more feature images, and establishing the image enhancement model based on the loss function. A to-be-enhanced image can be input into the established image enhancement model to obtain an enhanced image.

14 Claims, 8 Drawing Sheets

TRAINING IMAGE ENHANCEMENT MODEL AND ENHANCING IMAGE

CROSS REFERENCE TO RELATED APPLICATIONS

The present disclosure claims priority to Chinese Patent Application No. 201910395631.0 filed on May 13, 2019, the entire content of which is incorporated herein by reference.

TECHNICAL FIELD

The present disclosure relates to the field of image processing, and more particularly, to methods and apparatus for training image enhancement models and enhancing images.

BACKGROUND

As a data expression method, a neural network can approximate any function in theory. The essence of training is to find a weight corresponding to each layer of the neural network through a learning algorithm to ensure that an output of the neural network can fit a corresponding input. A loss function can be used to quantify this objective.

In some cases, image enhancement processing may be carried out by manually designing certain features for a loss function to achieve image enhancement effects such as image de-noising, artifact reduction, de-blurring, and image restoration.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods, devices, systems and apparatus for training image enhancement models and enhancing images using the trained image enhancement models.

One aspect of the present disclosure features a computer-implemented method of training image enhancement models. The computer-implemented method includes: for each of one or more constraint features, processing a ground truth image with the constraint feature to obtain a feature image corresponding to the constraint feature; for each of one or more feature images corresponding to the one or more constraint features, training a convolutional neural network (CNN) structure model corresponding to the feature image using the ground truth image and the feature image; determining a loss function of an image enhancement model based on one or more CNN structure models corresponding to the one or more feature images; and establishing the image enhancement model based on the loss function.

In some embodiments, the one or more constraint features include at least one of: a Sobel feature, a Prewitt feature, a contourlet transform feature, a gradient feature, or a feature of a target layer in a corresponding CNN structure model, the feature of the target layer being superior to the feature of each of other layers in the corresponding CNN structure model.

In some embodiments, training the CNN structure model corresponding to the feature image using the ground truth image and the feature image includes: training, based on deep learning, the CNN structure model corresponding to the feature image using the ground truth image as an input image and the feature image as a label image.

In some embodiments, determining the loss function of the image enhancement model based on the one or more CNN structure models corresponding to the one or more feature images includes: determining a respective weight value for each of the one or more CNN structure models; multiplying each of the one or more CNN structure models with the respective weight value to obtain a respective product; and taking a sum of the one or more respective products as the loss function of the image enhancement model.

In some embodiments, determining the respective weight value of each of the one or more CNN structure models can includes: for each of the one or more CNN structure models, determining the respective weight value of the CNN structure model based on an order of magnitude and a contribution corresponding to the CNN structure model, the respective weight value of the CNN structure model being proportional to the contribution corresponding to the CNN structure model. For each of the one or more CNN structure models, a product of multiplying the order of magnitude corresponding to the CNN structure model with the respective weight value can be an identical target order of magnitude. The order of magnitude corresponding to the CNN structure model can be an order of magnitude of numerical values of a predicted image from the CNN structure model, and the numerical values of the predicted image can refer to pixel values in the predicted image.

In some embodiments, establishing the image enhancement model based on the loss function includes: back propagating an error value computed by the loss function to adjust parameter values for each layer in the image enhancement model; and establishing the image enhancement model with the adjusted parameter values.

Another aspect of the present disclosure features a method of enhancing images, including: obtaining a pre-established image enhancement model and enhancing an image by inputting the image into the pre-established image enhancement model to obtain an enhanced image. The pre-established enhancement model can be established based on a loss function. The loss function can be determined based on one or more convolutional neural network (CNN) structure models respectively associated with one or more feature images. Each of the one or more CNN structure models can be trained using an associated feature image and a ground truth image, the associated feature image being obtained by processing the ground truth image with a corresponding constrain feature.

In some embodiments, for each of the one or more CNN structure models, the corresponding constraint feature includes one of: a Sobel feature, a Prewitt feature, a contourlet transform feature, a gradient feature, and a feature of a target layer in the CNN structure model, the feature of the target layer in being superior to the feature of each of other layers in the CNN structure model.

Each of the one or more CNN structure models can be trained based on deep learning using the ground truth image as an input image and the associated feature image as a label image. The loss function of the pre-established image enhancement model can be a sum of products, each of the products being obtained by multiplying a corresponding one of the one or more CNN structure models with a weight value associated with the CNN structure model. The weight value associated with the CNN structure model can be determined based on an order of magnitude and a contribution corresponding to the CNN structure model, the weight value being proportional to the contribution, and for each of the one or more CNN structure models, a product of multiplying the order of magnitude corresponding to the CNN structure model with the weight value associated with the CNN structure model can be an identical target order of magnitude. The order of magnitude corresponding to the CNN structure model can be an order of magnitude of numerical values of a predicted image from the CNN structure model, and the numerical values of the predicted image cab refer to pixel values in the predicted image.

In some embodiments, the pre-established image enhancement model is established based on the loss function by back propagating an error value computed by the loss function to adjust parameter values for each layer in the pre-established image enhancement model and establishing the pre-established image enhancement model with the adjusted parameter values.

A further aspect of the present disclosure features a device including: at least one processor; and at least one non-transitory machine readable storage medium coupled to the at least one processor having machine-executable instructions stored thereon that, when executed by the at least one processor, cause the at least one processor to perform operations including: for each of one or more constraint features, processing a ground truth image with the constraint feature to obtain a feature image corresponding to the constraint feature; for each of one or more feature images corresponding to the one or more constraint features, training a convolutional neural network (CNN) structure model corresponding to the feature image using the ground truth image and the feature image; determining a loss function of the image enhancement model based on one or more CNN structure models corresponding to the one or more feature images; and establishing the image enhancement model based on the loss function.

In some embodiments, the one or more constraint features include at least one of: a Sobel feature, a Prewitt feature, a contourlet transform feature, a gradient feature, or a feature of a target layer in a corresponding CNN structure model, the feature of the target layer being superior to the feature of each of other layers in the corresponding CNN structure model.

Training the CNN structure model corresponding to the feature image using the ground truth image and the feature image can include: training, based on deep learning, the CNN structure model corresponding to the feature image using the ground truth image as an input image and the feature image as a label image. Determining the loss function of the image enhancement model based on the one or more CNN structure models corresponding to the one or more feature images can include: determining a respective weight value of each of the one or more CNN structure models; multiplying each of the one or more CNN structure models with the respective weight value to obtain a respective product; and taking a sum of the one or more respective products as the loss function of the image enhancement model.

In some embodiments, determining the respective weight value of each of the one or more CNN structure models includes: for each of the one or more CNN structure models, determining a weight value of the CNN structure model based on an order of magnitude and a contribution corresponding to the CNN structure model, the weight value of the CNN structure model being proportional to the contribution of the CNN structure model. For each of the one or more CNN structure models, a product of multiplying the order of magnitude corresponding to the CNN structure model with the weight value associated with the CNN structure model can be an identical target order of magnitude.

The operations can further include: inputting a to-be-enhanced image to the image enhancement model to obtain an enhanced image.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Image enhancement processing may be carried out by manually designing certain features for a loss function. If the loss function is provided relatively simply, the loss function can be expressed in an analytical expression form. However, most of such loss functions treat each pixel in the image equally, generally considering only grayscale information of the pixels, with no consideration on relationship between neighbouring pixels and location information of the pixels, which may cause problems such as over-blurring and over-smoothing in the resulted image.

If the loss function is provided relatively complicatedly, it is difficult to express such loss function in the analytical expression form. Even if an analytical expression is obtained, it is difficult to solve a derivative of the analytical expression.

In addition, considering that most of the loss functions include only one or two parts of the features, and cannot fully reflect multiple features to be constrained. If the number of components is increased for the loss function, on the one hand, the running time of the algorithm will be prolonged, and on the other hand, the above problems caused by the complicated loss function may occur.

Before describing the method of training an image enhancement model provided by examples of the present disclosure, an image enhancement processing process in the related art will be explained first.

Image enhancement can include a series of inverse derivation problems. Image enhancement can include image de-noising, artifact reduction, de-blurring, image recovery and other categories, which belongs to a process of seeking cause from an effect. The purpose is to find a set of optimal parameters to characterize a directly observed system, which is involved in many scientific fields and engineering fields and shown in the following formula:

$$g = T(f_{true} + \delta_g) \quad (1)$$

Formula (1) indicates reconstructing signals $f_{true} \in X$ from data $g \in Y$, X, Y respectively denote a vector space, $\delta_g$ denotes noise. A mapping relationship $Y \to X$ can model a given signal with noise, to realize the space conversion.

A priori knowledge can be used to constrain such inverse problems. Based on the priori knowledge, it is possible to narrow the scope of the solution space by constraining the unique features of the image from a large number of solution spaces, which is conducive to finding a global optimal solution. Therefore, in this process, designing a strong regularization of the priori knowledge is a crucial step.

Figure 1A:
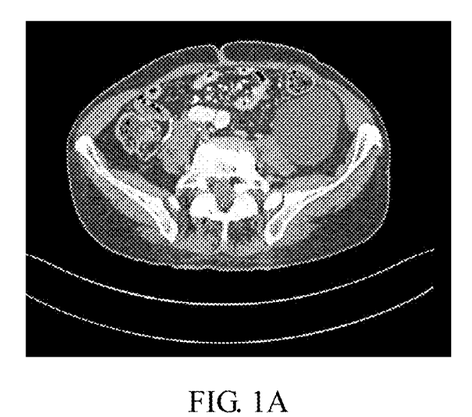
FIGS. 1A and 1B are schematic diagrams illustrating an effect of image enhancement.
Figure 1B:
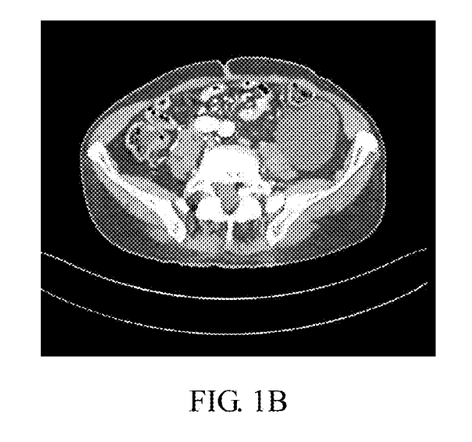

The priori knowledge of image enhancement can be manually designed based on characteristics of the image and experience. For example, most of natural images show sparseness and piecewise smoothing after wavelet transform. In this case, the priori knowledge includes a constraint of a wavelet coefficient or that the gradient space has sparseness. Although these priori knowledge can be used in the field of image enhancement, if the loss function is constructed based on the priori knowledge and the constructed loss function is then used to enhance the image, it is easy to cause over-smoothing in the enhanced image because the optimal solution of the loss function cannot be constrained. For example, when the image shown in FIG. 1A is subjected to image enhancement processing to obtain the enhanced image shown in FIG. 1B, the enhanced image shown in FIG. 1B has a problem of over-smoothing. In some cases, to solve the problem of over-smoothing caused by the loss function constructed with the priori knowledge, some feature parameters of the loss function can be highlighted to achieve different image enhancement effects.

For example, to achieve the image enhancement effect that highlights the image edge, the norm $L_1$ can be weighted when designing the loss function, as shown in the following formula:

$$\arg\min_x E(x) = \alpha \|Ax - y\|_1 \quad (2),$$

where $\alpha$ denotes a weight coefficient, and for an edge area with a relatively larger gradient, the weight coefficient can be set to a relatively larger value. In contrast, for a relatively flat area, the weight coefficient can be set to a relatively small value. x denotes an input image, y denotes a ground truth image, and A denotes a matrix corresponding to the current algorithm. For example, when the current algorithm is an image enhancement algorithm, A denotes an image enhancement matrix; when the current algorithm is the image de-noising algorithm, A denotes an image de-noising matrix. 1 denotes the norm $L_1$, and arg min denotes a variable value that makes the objective function take the minimum value.

Figure 2:
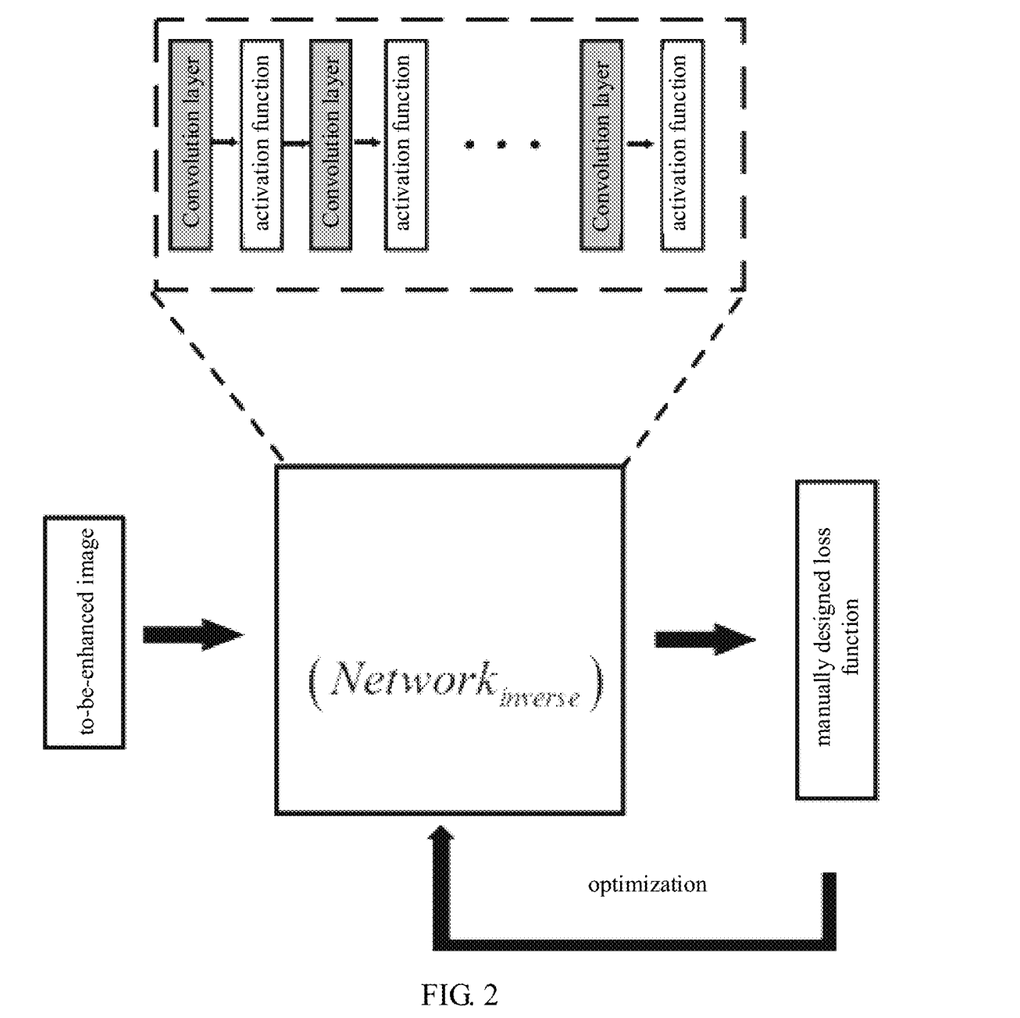
FIG. 2 is a schematic diagram illustrating a scene of training an image enhancement model.

The configuration of the above algorithm is shown in FIG. 2. A to-be-enhanced image is input into a network structure $Network_{inverse}$ to obtain a predicted image, and then the predicted image together with the ground truth image corresponding to the to-be-enhanced image is input into a loss function to calculate an error. Inverse derivation is performed from this error, to adjust respective parameter(s) in each convolution layer of $Network_{inverse}$, so as to reduce subsequently calculated errors. In examples of the present disclosure, the term "convolution layer" and the term "layer" can be used interchangeably.

When the subsequently calculated errors are small enough, it can be considered that the training of the network structure $Network_{inverse}$ is completed. Then, a to-be-enhanced image may be input the trained network structure $Network_{inverse}$, through forward propagation in the trained network structure $Network_{inverse}$, a predicted image can be obtained. At this time, the predicted image is an enhanced image.

However, the loss function involved in the above method is either too simple, which may cause problems such as over-blurring and over-smoothing in the image, or too complicated and cannot be expressed in an analytical expression form, which may make derivation difficult. Moreover, the loss function cannot fully reflect multiple constraint features.

Figure 3:
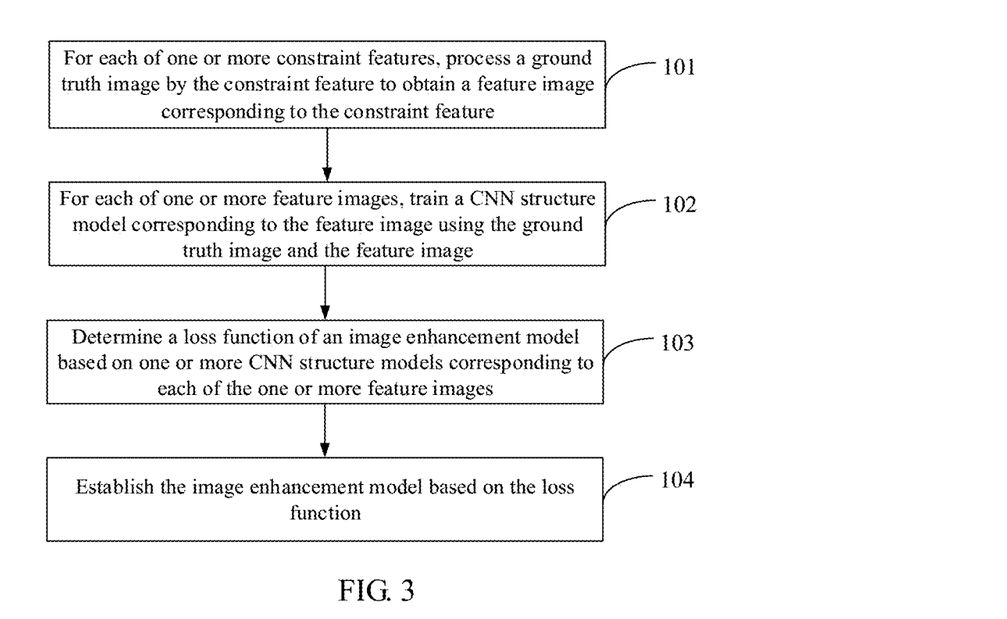
FIG. 3 is a flowchart illustrating a process of a method of training an image enhancement model according to one or more examples of the present disclosure.

Based on this, embodiments of the present disclosure provide a method of training an image enhancement model. FIG. 3 is a flowchart illustrating a process of a method of training an image enhancement model according to one or more examples of the present disclosure. As shown in FIG. 3, the process includes the following steps 101-104.

At step 101, for each of one or more constraint features, a ground truth image is processed by the constraint feature to obtain a feature image corresponding to the constraint feature.

At step 102, for each of the one or more feature images corresponding to the one or more constrain features, the ground truth image and the feature image are used to train a convolutional neural network (CNN) structure model corresponding to the feature image.

At step 103, a loss function of the image enhancement model is determined based on the CNN structure models corresponding to the one or more feature images.

At step 104, the image enhancement model is established based on the loss function, e.g., by training the image enhancement model based on the loss function as described below.

Based on steps 101-104, for each constraint feature, a corresponding CNN structure model can be trained separately; based on all of the CNN structure models, the loss function of the image enhancement model can be obtained; and finally the image enhancement model can be established based on the loss function. Through the above process, the loss function is no longer expressed in an analytical expression manner, but is modelled, which can solve the problems of over-smoothing and over-blurring in the image enhancement process, and speed up the image enhancement processing.

For the above step 101, relevant techniques can be used to extract at least one constraint feature (or one or more constraint features) from the ground truth image. In some examples, assume that there are two constraint features: a first constraint feature and a second constraint feature. The first constraint feature is extracted from the ground truth image to obtain a feature image corresponding to the first constraint feature. The second constraint feature is extracted from the ground truth image to obtain a feature image corresponding to the second constraint feature. The ground truth image in examples of the present disclosure can refer to a high-quality image corresponding to an input image. The ground truth image is a desired or expected image which can be obtained when the image enhancement model works perfectly. For example, in image de-noising, an input for a deep learning network is an image with noise, and the ground truth image thereof refers to a high-quality image corresponding to the image with noise, that is, an image without noise. The ground truth image has the same shape as that of the input image. The ground truth image involved in examples of the present disclosure include but not limited to a two-dimensional image.

The at least one constraint feature can include any image feature, such as a Sobel feature and a Pruitt feature. Sobel operator is a discrete first-order differentiation operator and used to compute an approximation of the gradient of the image intensity function. The Prewitt operator is a discrete differentiation operator and used to compute an approximation of the gradient of the image intensity function. At each point in the image, the result of the Prewitt operator is either the corresponding gradient vector or the norm of this vector. The Prewitt operator is based on convolving the image with a small, separable, and integer valued filter in horizontal and vertical directions and is therefore relatively inexpensive in terms of computations like Sobel and Kayyali operators. On the other hand, the gradient approximation which it produces is relatively crude, in particular for high frequency variations in the image. The Sobel feature and the Prewitt operator are used with edge detection algorithms.

The at least one constraint feature can also include a contourlet transform feature. The contourlet transform is a multiresolution, local, and directional two-dimensional image representation method. The contourlet transform performs multi-scale analysis and direction analysis separately. That is, first, LP (LaplacianPyramid) transform is performed to decompose the image in multiple dimensions, to obtain singular points; and then, singular points distributed in the same direction are combined into a coefficient through a DFB (Directional Filter Bank) to approximate the original image with a basis function similar to the contour segment. The length of a support interval of the basis function changes with the scale, and can describe the edge of the image in a near optimal way. The contourlet transform is defined directly in a discrete domain, and then the discrete domain and the continuous domain are connected, and its approximation is discussed in the continuous domain.

The at least one constraint feature can also include a gradient feature. An image may be interpreted as a two-dimensional discrete number set. By generalizing a two-dimensional continuous method to find the partial derivative of the function, the partial derivative of the image is obtained, that is, the maximum rate of change at that point, which is the gradient feature herein.

Figure 4A:
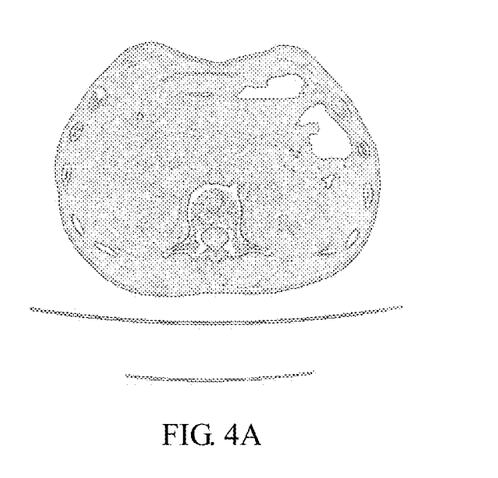
FIGS. 4A and 4B are schematic diagrams illustrating feature images to train the image enhancement model according to one or more examples of the present disclosure.
Figure 4B:
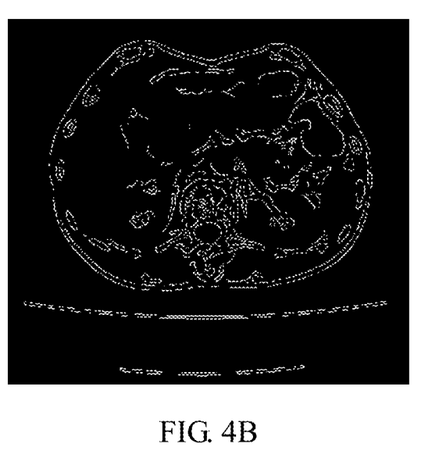

In some examples, the at least one constraint feature also includes a feature of a target layer in a CNN structure model, and the feature of the target layer is superior to the feature of each of other layers in the CNN structure model. Neural networks can include dozens or even hundreds of layers, and the output of each layer of the CNN structure model can be regarded as a feature. For example, if an edge display feature of the target layer in the CNN structure model trained in other similar tasks is superior to the edge display features of the other layers, the edge display feature of the target layer can be used as the constraint feature. Edge feature include edge display feature. Edge feature can highlight the edges of the image. In other words, the edge of the image can be obtained by using edge feature. During training of the image enhancement model, at least one of the above-mentioned constrain features can be extracted from the ground truth image respectively, so as to obtain a feature image corresponding to each of the constrain features. For example, different constrain features can be respectively extracted from the ground truth image corresponding to the image shown in FIG. 1A, to obtain feature images shown in FIGS. 4A and 4B. The feature image shown in FIG. 4A is a feature image obtained by processing the ground truth image with a filter feature, and the feature image shown in FIG. 4B is a feature image obtained by processing the ground truth image with an edge feature. In some examples, Gaussian filtering, median filtering or other operations can be used to process the ground truth image to obtain the feature image corresponding to the filter feature shown in FIG. 4A.

Figure 5:
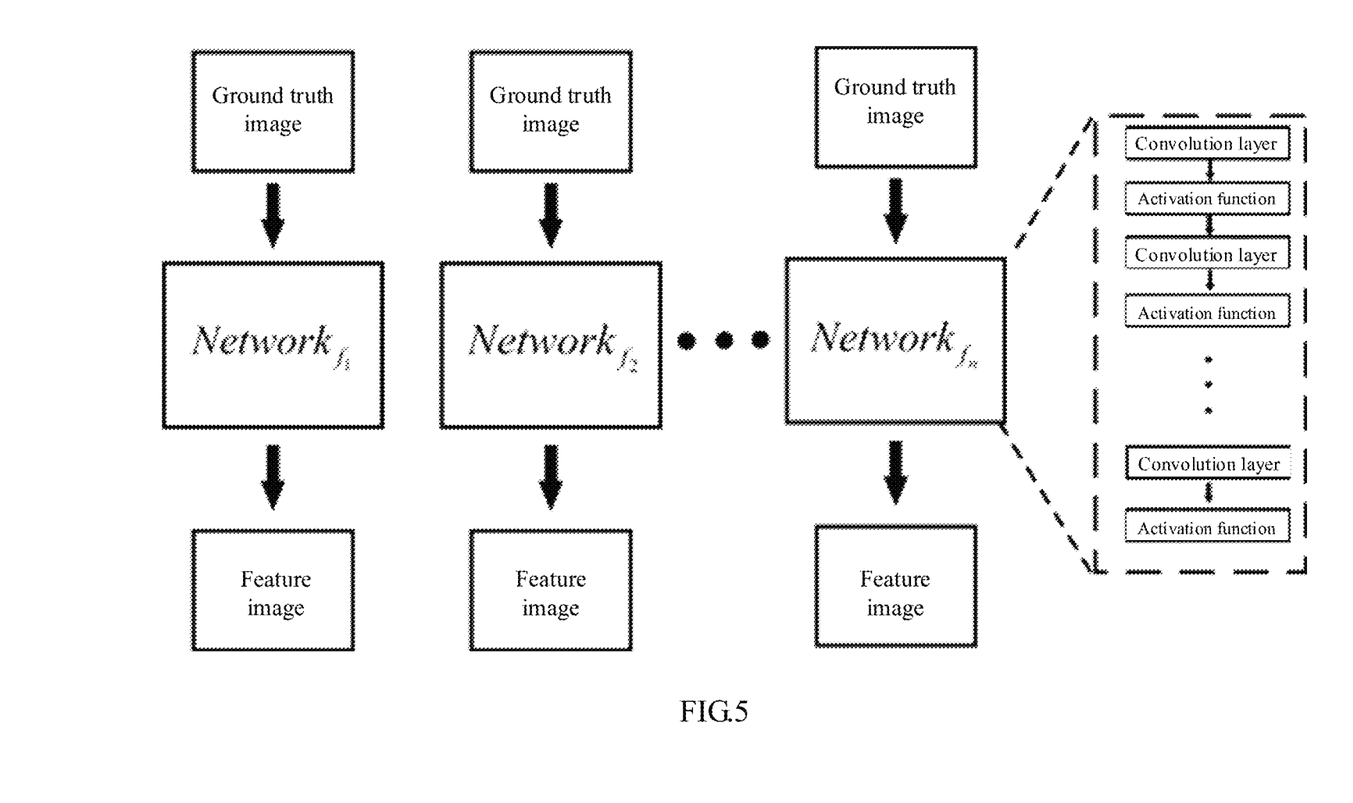
FIG. 5 is a schematic diagram illustrating a scenario of training a CNN structure model according to one or more examples example of the present disclosure.

For the step 102, when training the CNN structure models corresponding to the feature images, as shown in FIG. 5, the ground truth image is used as an input image, and each of the feature images can be used as a label image. Each CNN structure model can include a respective Network structure Network$_{fi}$, where i is an integer among a range from 1 to n and Networkf$_i$ denotes the i-th CNN structure model. Each network structure Network$_{fi}$ can include a series of convolution layers and activation functions between adjacent convolution layers. In FIG. 5, taking the network structure Network$_{fi}$ as an example, the network structure Network$_{fi}$ including a series of convolution layers and activation functions between adjacent convolution layers is shown. Further, the respective CNN structure model Network$_{f1}$, Network$_{f2}$, . . . , Network$_{fn}$, corresponding to each of the feature images is trained based on depth learning. The label image has the same size as that of the input image.

Figure 6:
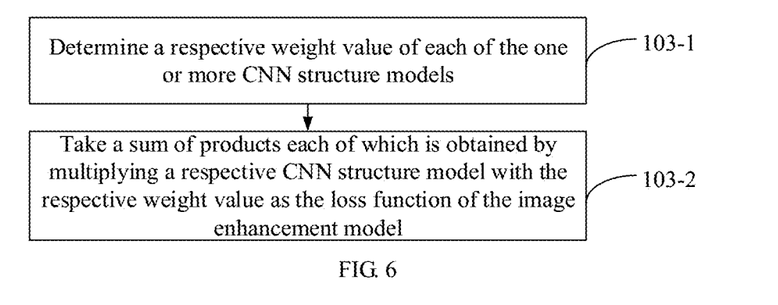
FIG. 6 is a flowchart illustrating another method of training an image enhancement model according to one or more examples of the present disclosure.

For the step 103, as shown in FIG. 6, FIG. 6 is a flowchart illustrating a process of a method of training an image enhancement model shown on the basis of the example shown in FIG. 1. The process includes the above steps 101-104 and related details are omitted for brevity. Step 103 includes the following steps.

At step 103-1, a respective weight value of each of the CNN structure models is determined.

At this step 103-1, for each CNN structure model, a weight value of the CNN structure model can be determined based on an order of magnitude and a contribution corresponding to the CNN structure model. The order of magnitude corresponding to the CNN structure model is an order of magnitude of numerical values of a predicted image from the CNN structure model, and the numerical values of the predicted image refer to pixel values in the predicted image, such as grey values. For each of the CNN structure models, an identical target order of magnitude is obtained by multiplying the order of magnitude corresponding to the CNN structure model with the weight value corresponding to the CNN structure model. That is, for each of the CNN structure models, the product of multiplying the corresponding order of magnitude with the corresponding weight value is identical to each other. The weight value for the CNN structure model is proportional to the contribution for the CNN structure model. The contribution for the CNN structure model depends on a desired image enhancement effect. For example, if the desired image enhancement effect is to increase clarity of the entire image, the weight value of the CNN structure model associated with the clarity of the entire image is relatively larger. For another example, if the desired image enhancement effect is to increase clarity of the outline of the image, the weight value of the CNN structure model associated with the clarity of the outline of the image is relatively larger. For another example, when the desired image enhancement effect is to retain small structures in the image as much as possible, the weight value of the CNN structure model associated with the retention degree of small structures is relative larger.

For example, the order of magnitude of the numerical values in the predicted image from the first CNN structure model is $10^2$, such as from 100 to 500, and the order of magnitude of the numerical values in the predicted image from the second CNN structure model is $10^{-1}$, such as from 0.1 to 0.5. When determining the loss function subsequently, to avoid that since the order of magnitude of the numerical values in the predicted image from the first CNN structure model significantly differs from the order of magnitude of the numerical values in the predicted image from the second CNN structure model, the second CNN structure model is weaker than the first CNN structure model in the loss function, the order of magnitude of the weight value of the first CNN structure model may be set to $10^{-2}$, and the order of magnitude of the weight value of the second CNN structure model may be set to $10^1$. In this way, an identical target order of magnitude can be obtained by multiplying the respective order of magnitude corresponding to each CNN structure model with a respective weight value.

In addition, the weight value of the CNN structure model may be determined based on the contribution of the CNN structure model, that is, the weight value of the CNN structure model may be determined based on the contribution of the constraint feature corresponding to the CNN structure model. For example, if the desired image enhancement effect is to obtain an enhanced image with more clarified edges, the weight value of the CNN structure model corresponding to the edge feature can be set larger than the weight values of the CNN structure models corresponding to other constraint features. In this way, an enhanced image with more clarified edges can be obtained based on the loss function.

At step 103-2, a sum of products each of which is obtained by multiplying the respective CNN structure model with the respective weight value is used as the loss function of the image enhancement model.

In an example of the present disclosure, the loss function Loss of the image enhancement model can be expressed by the following formula:

$$\text{Loss} = \sum_{i=1}^{n} a_i \times \text{Networkf}_i, \quad (3)$$

where $\text{Networkf}_i$ denotes the i-th CNN structure model, and $a_i$ denotes the weight value corresponding to the i-th CNN structure model. In some examples, after determining the loss function, an optimization algorithm can be used to determine a solution to reach a minimum value of the loss function.

Figure 7:
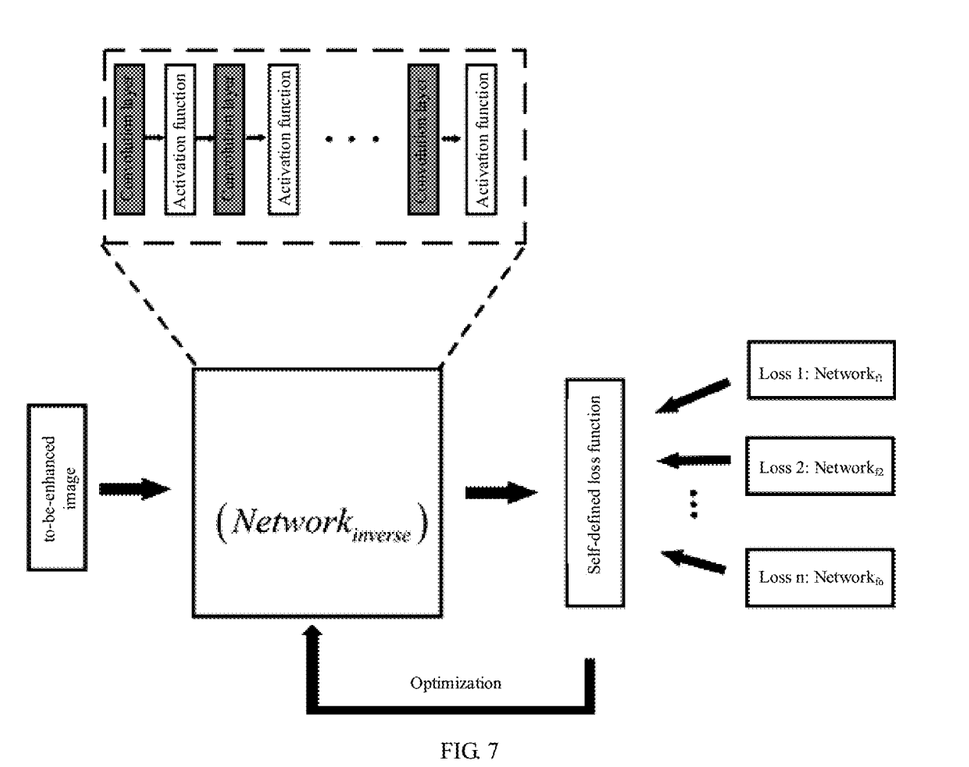
FIG. 7 is a schematic diagram illustrating an image enhancement model according to one or more examples of the present disclosure.

For the step 104, the process of establishing an image enhancement model based on the loss function can be as shown in FIG. 7.

As illustrated in FIG. 7, the image enhancement model can include a network structure $\text{Network}_{inverse}$. The network structure $\text{Network}_{inverse}$ can include a series of convolution layers with activation functions between adjacent convolution layers. A to-be-enhanced image can be input into the network structure $\text{Network}_{inverse}$ to obtain a predicted image, and then the predicted image together with the ground truth image corresponding to the to-be-enhanced image can be input into a self-defined loss function to calculate an error value. The self-defined loss function can be determined at step 103 in FIG. 3 or step 103-2 in FIG. 6. The self-defined loss function Loss can be obtained based on loss functions (Loss1, Loss 2, . . . , Loss n) of the multiple CNN structure model ($\text{Network}_{f1}$, $\text{Network}_{f2}$, . . . , $\text{Network}_{fn}$), for example, according to the formula (3). For optimization, inverse derivation can be performed from the error value to adjust respective parameter values in each convolution layer of $\text{Network}_{inverse}$, so as to reduce subsequently calculated error values. When the subsequently calculated error values are small enough, it can be considered that the training of the network structure $\text{Network}_{inverse}$ (or the training of the image enhancement model) is completed, or the image enhancement model is established. That is, after the loss function is determined, the error value computed by the loss function can be back propagated to adjust the parameter values corresponding to each layer in the image enhancement model (or the network structure $\text{Network}_{inverse}$), thereby establishing the image enhancement model with the adjusted parameter values.

For a complicated loss function, the training method provided by the examples of the present disclosure does not need to determine an analytical expression of the loss function, nor does it require a self-defined gradient calculation formula, but utilizes the automatic derivation function of the deep learning framework to implement a minimizing process of the loss function. In addition, the training method provided by the examples of the present disclosure can self-define a respective CNN structure model corresponding to multiple constraint features, and take all of the multiple CNN structure models as components of the loss function of the image enhancement model through weighted summation. In addition, the training method provided by the examples of the present disclosure applies multiple constrains to multiple solution spaces such that the optimal solution that meets specific tasks and specific requirements can be found.

In some examples of the present disclosure, based on the trained image enhancement model, a process of a method of enhancing an image is also provided. The process includes: inputting a to-be-enhanced image into a pre-established image enhancement model to obtain an enhanced image.

The image enhancement model is a model obtained by using the above method of training an image enhancement model.

As shown in FIG. 7, the to-be-enhanced image can be input into the image enhancement model, and the enhanced image can be obtained through forward propagation.

In the process of obtaining the loss function of the image enhancement model, the solution spaces have been constrained by different constraint features, such as edge enhancement, de-blurring, etc. Therefore, the enhanced image obtained by the above method also has the constraint features, so the edges of the enhanced image can be more clarified and have higher resolution, and have no over-smoothing.

The method of enhancing an image provided by examples of the present disclosure includes two stages: an image enhancement model training stage and an image enhancement model application stage. The loss function is determined in the image enhancement model training stage. The determined loss function may be directly used in the image enhancement model application stage, that is, there is no need to re-calculate the loss function in the image enhancement model application stage, and thus the image enhancement model application stage runs faster. In other words, in the method of enhancing an image provided by examples of the present disclosure, a to-be-enhanced image is input into the image enhancement model, and an enhanced image can be directly output, and thus the image enhancement model application runs faster. The method of enhancing an image provided by examples of the present disclosure can be applied to any image enhancement processing such as image de-noising, image de-blurring, image restoration, and super-resolution reconstruction. When determining the loss function, different positions can be given different weight values to achieve a more comprehensive retention of high-frequency information in the resulted image and more clarified edges.

The examples of the present disclosure have been verified through experiments, taking low-dose CT image de-noising as an example. Of course, it is noted that the application field of the disclosed method is not limited to low-dose CT image de-noising, but is applicable to any image enhancement processing.

Figure 8A:
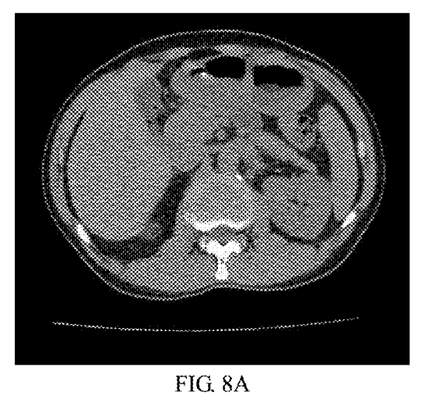
FIGS. 8A to 8C are schematic diagrams illustrating image enhancement effects according to one or more examples of the present disclosure.
Figure 8B:
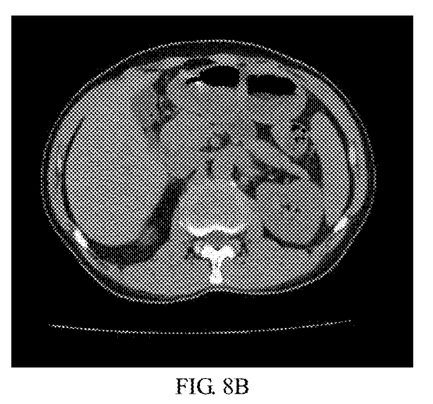
Figure 8C:
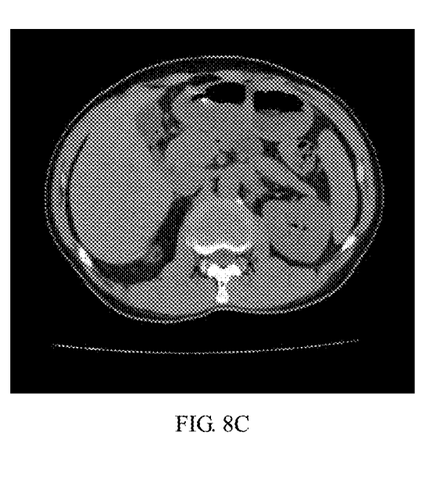

FIG. 8A shows an input low-dose CT image to be de-noised, FIG. 8B shows a corresponding ground truth image, and FIG. 8C shows an enhanced image for the low-dose CT image to be de-noised shown in FIG. 8A. The enhanced image is obtained with the method of enhancing an image provided by examples of the present disclosure. Compared with FIG. 1A and FIG. 1B, the experimental result obtained with the method of enhancing an image provided by examples of the present disclosure shows that the enhanced image shown in FIG. 8C has better uniformity and lower noise, the clarity of the edges is not degraded, that is, the enhanced has no over-smoothing, and the details of the anatomical structure of the enhanced image are better preserved, which can meet the clinical application needs and has good practicality.

Figure 9:
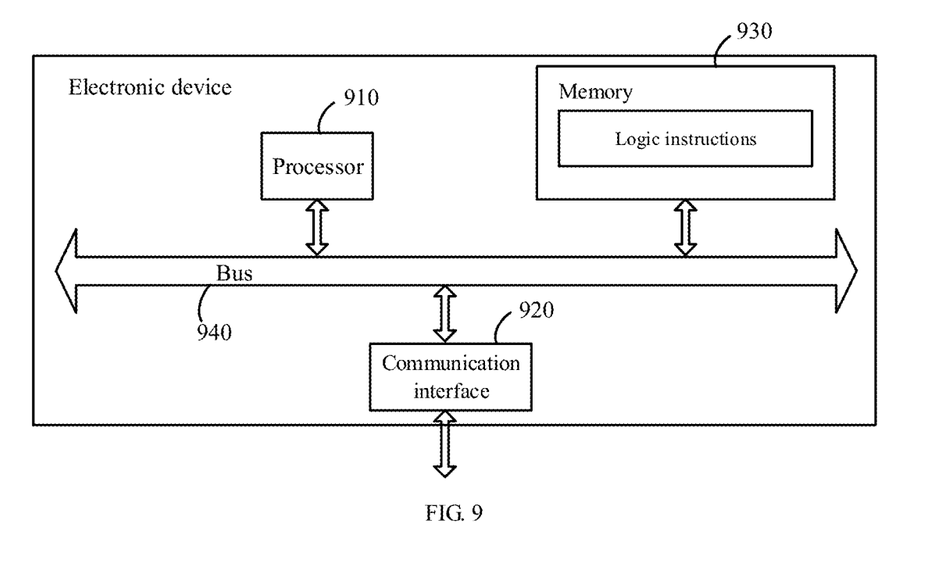
FIG. 9 is a schematic diagram illustrating a hardware structure of an electronic device according to one or more examples of the present disclosure.

The method of training an image enhancement model, especially the method of training a loss function and the method of enhancing an image, can be uniformly executed by an electronic device, and the structure of the electronic device can refer to the schematic diagram shown in FIG. 9. As shown in FIG. 9, the electronic device includes a processor 910, a communication interface 920, a memory 930, and a bus 940. The processor 910, the communication interface 920, and the memory 930 implement communication with each other via the bus 940.

The memory 930 can store logic instructions for training an image enhancement model and logic instructions for enhancing an image, and the memory can be, for example, a non-transitory memory. The processor 910 can invoke and execute the logic instructions for training an image enhancement model in the memory 930, to perform training first, obtain an image enhancement model, and then execute the logic instructions for enhancing an image. For example, the logic instructions for training an image enhancement model and the logic instructions for enhancing an image can be programs corresponding to some functions of the control software of a medical image acquisition system. When the processor executes the instructions, the electronic device can correspondingly display a function interface corresponding to the instructions on the display interface.

The functions of the logic instructions for training an image enhancement model and the logic instructions for enhancing an image can be stored in a non-transitory computer-readable storage medium if they are implemented in the form of software functional units and sold or used as independent products. Based on such an understanding, the technical solution of the present disclosure essentially or with the part contributing to the existing technology or part of the technical solution can be embodied in the form of a software product, the computer software product is stored in a storage medium, including some instructions are used to cause a computer device (which can be a personal computer, a server, or a network device, etc.) to perform all or part of the steps of the methods described in the embodiments of the present disclosure. The storage medium includes a U disk, a mobile hard disk, a read-only memory (ROM), a random access memory (RAM), a magnetic disk or an optical disk and other medium that can store program codes.

For simplicity and illustrative purposes, the present disclosure is described by referring mainly to examples thereof. In the above descriptions, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The above description is merely preferred examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above.

Therefore, without departing from the scope of the technical scheme of the present disclosure, based on technical essences of the present disclosure, any simple alterations, equal changes and modifications should fall within the protection scope of the technical scheme of the present disclosure. Accordingly, other embodiments are within the scope of the following claims.

What is claimed is:

1. A computer-implemented method of training image enhancement models, the computer-implemented method comprising:
   for each of one or more constraint features, processing a ground truth image with the constraint feature to obtain a feature image corresponding to the constraint feature;
   for each of one or more feature images corresponding to the one or more constraint features, training a convolutional neural network (CNN) structure model corresponding to the feature image using the ground truth image and the feature image;

determining a loss function of an image enhancement model based on one or more CNN structure models corresponding to the one or more feature images; and establishing the image enhancement model based on the loss function, wherein determining the loss function of the image enhancement model based on the one or more CNN structure models corresponding to the one or more feature images comprises:

determining a respective weight value for each of the one or more CNN structure models;

multiplying each of the one or more CNN structure models with the respective weight value to obtain a respective product; and taking a sum of the one or more respective products as the loss function of the image enhancement model, and wherein determining the respective weight value of each of the one or more CNN structure models comprises:

for each of the one or more CNN structure models, determining the respective weight value of the CNN structure model based on an order of magnitude and a contribution corresponding to the CNN structure model, the respective weight value of the CNN structure model being proportional to the contribution corresponding to the CNN structure model, wherein, for each of the one or more CNN structure models, a product of multiplying the order of magnitude corresponding to the CNN structure model with the respective weight value is an identical target order of magnitude.

2. The computer-implemented method of claim 1, wherein the one or more constraint features comprise at least one of:
   a Sobel feature,
   a Prewitt feature,
   a contourlet transform feature,
   a gradient feature, or
   a feature of a target layer in a corresponding CNN structure model, the feature of the target layer being superior to the feature of each of other layers in the corresponding CNN structure model.

3. The computer-implemented method of claim 1, wherein training the CNN structure model corresponding to the feature image using the ground truth image and the feature image comprises:
   training, based on deep learning, the CNN structure model corresponding to the feature image using the ground truth image as an input image and the feature image as a label image.

4. The computer-implemented method of claim 1, wherein the order of magnitude corresponding to the CNN structure model is an order of magnitude of numerical values of a predicted image from the CNN structure model, and
   wherein the numerical values of the predicted image refer to pixel values in the predicted image.

5. The computer-implemented method of claim 1, wherein establishing the image enhancement model based on the loss function comprises:
   back propagating an error value computed by the loss function to adjust parameter values for each layer in the image enhancement model; and
   establishing the image enhancement model with the adjusted parameter values.

6. A method of enhancing images, comprising:
   obtaining a pre-established image enhancement model; and
   enhancing an image by inputting the image into the pre-established image enhancement model to obtain an enhanced image,
   wherein the pre-established image enhancement model is established based on a loss function,
   wherein the loss function is determined based on one or more convolutional neural network (CNN) structure models respectively associated with one or more feature images,
   wherein the loss function of the pre-established image enhancement model is a sum of products, each of the products being obtained by multiplying a corresponding CNN structure model of the one or more CNN structure models with a weight value associated with the CNN structure model, and wherein the weight value associated with the CNN structure model is determined based on an order of magnitude and a contribution corresponding to the CNN structure model, the weight value being proportional to the contribution,
   wherein, for each of the one or more CNN structure models, a product of multiplying the order of magnitude corresponding to the CNN structure model with the weight value associated with the CNN structure model is an identical target order of magnitude, and
   wherein each of the one or more CNN structure models is trained using an associated feature image and a ground truth image, the associated feature image being obtained by processing the ground truth image with a corresponding constrain feature.

7. The method of claim 6, wherein, for each of the one or more CNN structure models, a corresponding constraint feature comprises one of:
   a Sobel feature,
   a Prewitt feature,
   a contourlet transform feature,
   a gradient feature, and
   a feature of a target layer in the CNN structure model, the feature of the target layer in being superior to the feature of each of other layers in the CNN structure model.

8. The method of claim 6, wherein each of the one or more CNN structure models is trained based on deep learning using the ground truth image as an input image and the associated feature image as a label image.

9. The method of claim 6, wherein the order of magnitude corresponding to the CNN structure model is an order of magnitude of numerical values of a predicted image from the CNN structure model, and the numerical values of the predicted image refer to pixel values in the predicted image.

10. The method of claim 6, wherein the pre-established image enhancement model is established based on the loss function by
    back propagating an error value computed by the loss function to adjust parameter values for each layer in the pre-established image enhancement model, and
    establishing the pre-established image enhancement model with the adjusted parameter values.

11. A device comprising:
    at least one processor; and
    at least one non-transitory machine readable storage medium coupled to the at least one processor having machine-executable instructions stored thereon that, when executed by the at least one processor, cause the at least one processor to perform operations comprising:

for each of one or more constraint features, processing a ground truth image with the constraint feature to obtain a feature image corresponding to the constraint feature;

for each of one or more feature images corresponding to the one or more constraint features, training a convolutional neural network (CNN) structure model corresponding to the feature image using the ground truth image and the feature image;

determining a loss function of an image enhancement model based on one or more CNN structure models corresponding to the one or more feature images; and establishing the image enhancement model based on the loss function, wherein determining the loss function of the image enhancement model based on the one or more CNN structure models corresponding to the one or more feature images comprises:

determining a respective weight value of each of the one or more CNN structure models;

multiplying each of the one or more CNN structure models with the respective weight value to obtain a respective product; and taking a sum of the one or more respective products as the loss function of the image enhancement model, and wherein determining the respective weight value of each of the one or more CNN structure models comprises:

for each of the one or more CNN structure models, determining a weight value of the CNN structure model based on an order of magnitude and a contribution corresponding to the CNN structure model, the weight value of the CNN structure model being proportional to the contribution of the CNN structure model, wherein, for each of the one or more CNN structure models, a product of multiplying the order of magnitude corresponding to the CNN structure model with the weight value associated with the CNN structure model is an identical target order of magnitude.

12. The device of claim 11, wherein the one or more constraint features comprise at least one of:
a Sobel feature,
a Prewitt feature,
a contourlet transform feature,
a gradient feature, or
a feature of a target layer in a corresponding CNN structure model, the feature of the target layer being superior to the feature of each of other layers in the corresponding CNN structure model.

13. The device of claim 11, wherein training the CNN structure model corresponding to the feature image using the ground truth image and the feature image comprises:
training, based on deep learning, the CNN structure model corresponding to the feature image using the ground truth image as an input image and the feature image as a label image.

14. The device of claim 11, wherein the operations further comprise:
inputting a to-be-enhanced image to the image enhancement model to obtain an enhanced image.

* * * * *